(12) United States Patent
Wallentine et al.

(10) Patent No.: US 6,557,113 B1
(45) Date of Patent: Apr. 29, 2003

(54) SYNCHRONIZATION RECOVERY TECHNIQUE FOR STORAGE MEDIA

(75) Inventors: Don Wilford Wallentine, Mantua, UT (US); Mark Dale Thornley, Layton, UT (US); George Paul Jackson, Hooper, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/427,451

(22) Filed: Oct. 26, 1999

(51) Int. Cl.[7] .............................................. G06F 11/00
(52) U.S. Cl. ............................................ 714/5; 360/48
(58) Field of Search .............................. 714/5, 7, 8, 20, 714/21, 25, 26, 39, 41, 54, 43, 47; 711/4, 133; 360/48, 46, 51

(56) References Cited

U.S. PATENT DOCUMENTS

| | | | | |
|---|---|---|---|---|
| 5,051,998 A | * | 9/1991 | Murai et al. ............... | 371/39.1 |
| 5,057,785 A | * | 10/1991 | Chung et al. .............. | 328/162 |
| 5,313,340 A | * | 5/1994 | Takayama et al. .......... | 360/48 |
| 5,909,331 A | | 6/1999 | Behrens et al. ............. | 360/51 |
| 5,940,233 A | * | 8/1999 | Malone, Sr. ................ | 360/51 |
| 6,084,734 A | * | 7/2000 | Southerland et al. ........ | 360/53 |
| 6,147,827 A | * | 11/2000 | Southerland et al. ........ | 360/53 |
| 6,181,497 B1 | * | 1/2001 | Malone, Sr. ................ | 360/48 |
| 6,332,207 B1 | * | 12/2001 | Southerland et al. ....... | 714/763 |
| 6,392,830 B1 | * | 5/2002 | Malone, Sr. ................ | 360/48 |

FOREIGN PATENT DOCUMENTS

| | | |
|---|---|---|
| EP | 0 438 355 A1 | 7/1991 |
| EP | 0 473 293 A1 | 3/1992 |
| EP | 0 549 151 A2 | 6/1993 |
| EP | 0 549 155 A2 | 6/1993 |
| WO | WO 94/18670 | 8/1994 |
| WO | WO98/14936 | 4/1998 |

OTHER PUBLICATIONS

IBM®, "Data Recovery with Adaptive Sync Field Length," *IBM Technical Disclosure Bulletin*, Nov., 1994, 37(11), 385.

Hideo, O., "Protection Circuit for Synchronizing Signal," *Patent Abstracts of Japan*, for Publication No. 08083471 dated Mar. 26, 1996, 1 page.

* cited by examiner

*Primary Examiner*—Nadeem Iqbal
(74) *Attorney, Agent, or Firm*—Woodcock Washburn LLP

(57) ABSTRACT

The present invention relates to a data recovery technique for recovering unrecoverable data from a sector having a synchronization field damaged after formatting time or a synchronization mark that has been written improperly. The present invention may try conventional or traditional data recovery techniques first, but if these techniques are ineffective, these techniques can be bypassed in favor of an additional recovery mode. Based upon overall design parameters of a disk drive system and the recording medium format, the disk drive firmware estimates a synchronization mark starting position, analyzes the accuracy of that position and when re-synchronization has not yet occurred, the firmware makes iterative estimates within a window relative to the starting position, and analyzes these subsequent positions for accuracy as well. Once a synchronization mark is located, the data in the sector can be recovered.

29 Claims, 9 Drawing Sheets

SYNCHRONIZATION RECOVERY TECHNIQUE FOR STORAGE MEDIA

BACKGROUND OF THE INVENTION

1. Field of the Invention

The present invention relates to the recovery of data from a damaged recording medium or a recording medium with a writing error.

2. Brief Description of Prior Developments

Previously, conventional or traditional data recovery techniques have required that a synchronization mark be readable. Errors in synchronization marks have traditionally been minimized during the format of a recording medium by providing a flag before bad or unreadable sectors of a disk. In this fashion, a disk drive controller is able to skip any sector likely to yield errors in data reading and writing.

For situations when a synchronization mark becomes damaged or unreadable after format of the recording medium, alternate techniques have been developed. For example, fault tolerance techniques can be used to read marks which have not been destroyed beyond recognition. With these techniques, the correction capability is encoded into the mark itself. For example, a mark can be encoded with numerous bits, which can be sub-divided into different regions. One method allows for a certain number of these regions to be in error i.e., unreadable. A controller instructs the system to continue as if no error in reading the mark occurred within a pre-defined error tolerance. Another method that has been used is the encoding of synchronization marks with redundant or duplicate data, so that if one portion of the mark is unreadable, the head can still read a copy of the information.

Another previous fault tolerance technique involves the movement of the recording/reading head to one side or another by a predefined per cent. For example, if a synchronization mark is determined to be unreadable, the head can be moved offtrack by 10%. If the mark is still unreadable, the head can be moved off track by 15%. If the mark is still unreadable, the head can be moved off track by 20%. In this sequential manner, if the synchronization mark is unreadable due to debris, asperities, skewed positioning relative to the head, translated positioning relative to the head, or the like, the movement of the head away from the traditional recording path may yield readable mark information. Other techniques can utilize the remapping of data where possible, so that once recovered, data can be moved to a readable position. Still other techniques involve moving the head by seeking to a different adjacent track and then returning to the previously unreadable mark. The physical movement of the head itself can, for example, dislodge obstructive debris allowing the track to be read.

Sometimes, however, the synchronization mark becomes unreadable after format time, and these conventional data recovery techniques may be ineffective. In these circumstances, there is a problem that the synchronization of data may not be possible due to the unreadability of the synchronization mark. If the synchronization mark is not readable, the retrieval of subsequent data sectors becomes a difficult task.

SUMMARY OF THE INVENTION

The present invention relates to a data recovery technique for recovering unrecoverable data from a sector having a synchronization mark damaged after formatting time or a synchronization mark that has been written improperly. The present invention recognizes that conventional or traditional data recovery techniques may be applied first, but if these techniques are ineffective, these techniques can be bypassed in favor of a separate recovery mode. In this separate mode, based upon overall design parameters of a disk drive system and the recording medium format, a synchronization mark starting position is estimated. The accuracy of that position is determined ex post facto, for instance, by ECC analysis. If the estimated starting position does not result in the recovery of data, iterative estimates are made within a window relative to the estimated starting position. These subsequent positions are analyzed for accuracy as well. Once an estimate matches the actual starting position of the synchronization mark, the data in the sector can be recovered.

DETAILED DESCRIPTION OF THE DRAWINGS

The method and apparatus for data recovery are further described with reference to the accompanying drawings in which.

DETAILED DESCRIPTION OF PREFERRED EMBODIMENTS

The present invention is described herein with reference to a disk drive system with a typically formatted recording medium, and more particularly to a recording medium having a damaged synchronization mark or synchronization mark that has been written improperly. However, this is for illustrative use only since the invention could be employed with other data storage systems, such as any data storage system in which any unreadable portion of a recording medium inhibits the synchronization of data.

The invention described herein pertains to the recovery of data from a damaged recording medium or a recording medium with a writing error. If damage to a sector is severe enough and has occurred after format, traditional fault tolerance techniques employed by mark detect hardware may be insufficient for reading data contained in the sector. The present invention provides a way of recovering user data for circumstances in which traditional data recovery techniques have proven insufficient for purposes of recovering a synchronization mark. By knowing the disk format, track format and rotational speed of the recording medium, an estimate can be made concerning the starting position of a synchronization mark. Based on this estimate, a window of estimates can be utilized to re-synchronize and recover the data. By shifting different bit streams within this window into a buffer, different blocks of bit streams can be tested to validate that the synchronization mark location has been estimated correctly. Once the synchronization mark location has been estimated correctly, the stored user data can be accessed and recovered without error. Once recovered, the data can be remapped to a different location. An attempt can also be made to rewrite the synchronization mark.

Figure 1:
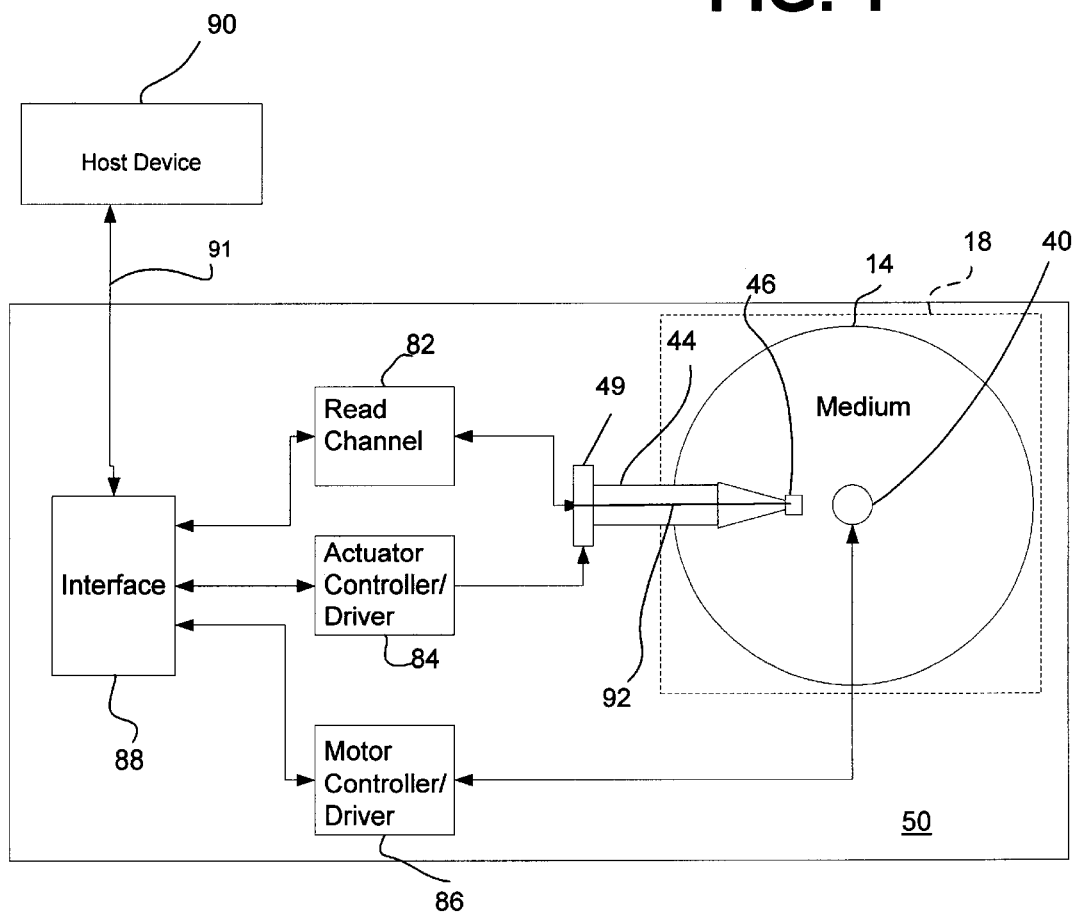
FIG. 1 represents a prototypical disk drive system in accordance with the present invention.

FIG. 1 is a schematic diagram of a storage drive for storing and retrieving information for a host device wherein the present invention may be employed. Host device 90 may be one of a number of various types of computer based devices such as a personal computer, a handheld computer, or the like. Host device 90 communicates with drive 50 via bus 91 by sending commands to write or read digital information to or from digital recording medium 14. Bus 90 may be any one of the various buses such as parallel, generic serial, USB, fire wire, SCSI, and so on.

Digital recording medium 14 may be one of any of the various digital data storage media such as magnetic, optical, or magneto-optical. Optionally, medium 14 may be fixed in the drive 50, or alternatively removable from drive 50. Where the medium 14 is removable from drive 50, medium 14 may be encased in an outer shell 18 to protect medium 14 from damage.

Drive 50 comprises a controller 88 that provides an interface with host device 90 as well as controlling the overall operation of Drive 50. Controller 88 is preferably a microprocessor-based controller. Drive 50 also comprises a read channel 82 for conditioning signals read from medium 14; actuator controller 84 for providing servo control and tracking; motor controller 86 for controlling the spin rate of medium 14 via a spindle motor 40, and an actuator assembly for reading the data from medium 14.

The actuator assembly comprises a read/write head 46 that is connected to a distal end of an actuator assembly. Read/write head 46 comprises a slider that carries a read/write element, either formed therein or attached thereto. The actuator assembly also comprises a suspension arm 44 and an actuator 49 that cooperate to move the slider 46 over the surface of medium 14 for reading and writing digital information. The read/write element of head 46 is electrically coupled to read channel 82 by way of electrical conductor 92.

Figure 1B:
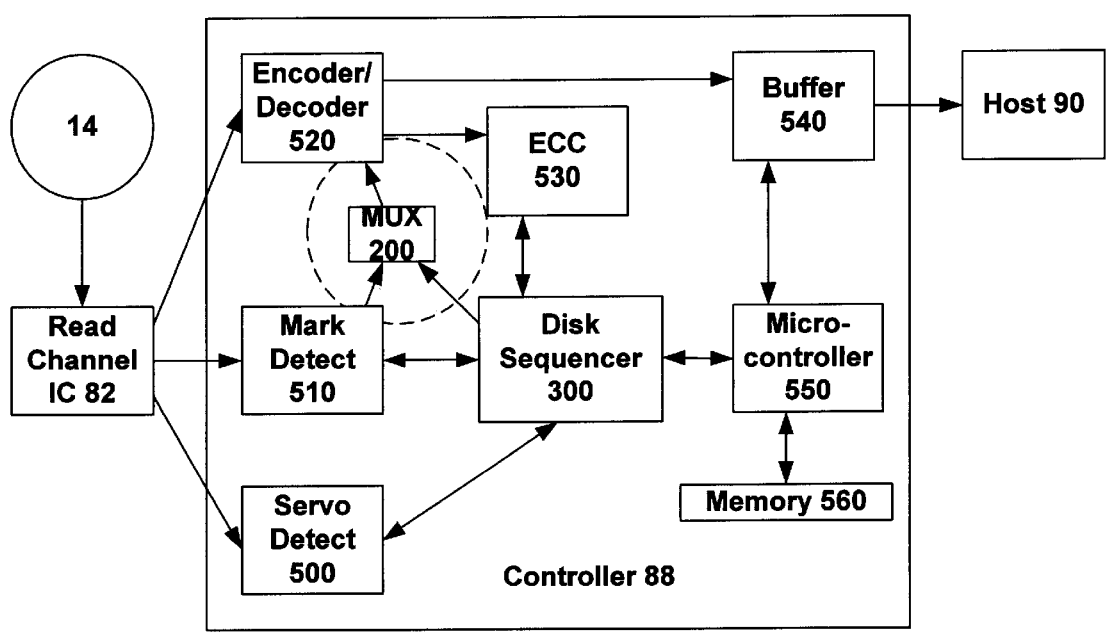
FIG. 1B represents a block diagram of a disk controller ASIC for a disk drive system in accordance with the present invention.

FIG. 1B shows a block diagram of a disk controller, which can be implemented with an ASIC, for a disk drive system in accordance with the present invention. Information from the recording medium 14 is processed by read channel integrated circuit 82 and output to a servo detect 500, a mark detect 510, or an encoder/decoder 520. The servo detect 500 comprises, inter alia, circuitry to recognize servo fields for preventing a head from deviation from a track. The mark detect 510 contains, inter alia, circuitry to recognize a synchronization mark, and circuitry to generate a synchronization signal for framing user data. The encoder/decoder 520 contains, inter alia, circuitry for encoding and decoding data from the read channel IC 82. Both the servo detect 500 and the mark detect 510 communicate with the disk sequencer 300 so that the disk sequencer can accordingly control the bit level timing of the data path. The disk sequencer 300 is responsible for control of when to start reading or writing a byte or a number of bytes, when to stop, when to begin ECC analysis of the data, and other timing control issues for the disk drive system.

Mark detect 510 detects when data corresponding to a synchronization mark is input to the mark detect 510 from the read channel 82. After a synchronization mark is detected, a synchronization signal is output from mark detect 510 for synchronization of user data, which is located in a user data field following the synchronization mark. This synchronization signal is what frames or synchronizes the encoder/decoder 520 to correctly decode the data field following the synchronization mark. In one embodiment, this, synchronization signal comprises a single pulse, and synchronization begins on the trailing edge of the pulse. Alternatively, for example, synchronization could occur on the leading edge of a pulse of a synchronization signal.

Previously, if the mark detect circuitry 510 did not detect a synchronization mark, traditional fault tolerance techniques could be used to try to recover the mark data. However, if these techniques were ineffective, the data could not be recovered. According to the present invention, if traditional techniques have been exhausted, instead of using the mark detect 510 circuitry to recover the mark, another data recovery mode can be used. By way of a switching device 200, which can be a multiplexor, a time programmable synchronization signal is produced by the disk sequencer 300 to frame or synchronize data in the encoder/decoder 520 for correct decoding. The switching device 200 enables the use of the time programmable signal from the disk sequencer 300 instead of the synchronization signal output from the mark detect 510.

Based on an estimate of the starting location of a synchronization mark and the known length of the synchronization mark, e.g. 35 bits, the disk sequencer 300 outputs a time programmable signal which enables the framing of user data which follows the synchronization mark. The first estimate of the starting location of a synchronization mark is a nominal position, from which point subsequent starting locations can be tried within a window containing the nominal position. The corresponding bit stream framed as a result of the time programmable synchronization signal is then placed into a buffer 540. After the user data field has been read, an ECC field corresponding to the user data is read and output to the ECC circuitry 530. As with the user data field, the ECC field is known to be a fixed distance from the synchronization mark's location, which controls when data is deemed to be the ECC field by the disk sequencer 300. Thus, if the estimate of the start of the synchronization mark is accurate, the synchronization signal for synchronization of the user data will also be correct so that both the user data field and the ECC field will be read correctly. Through subsequent ex post facto analysis of the data, the accuracy of the estimate can be ascertained.

A microcontroller 550, which can communicate with a memory 560, receives the buffered data from the buffer 540 and input from the ECC circuitry 530. At this stage, it is not known whether the data in buffer 540, which resulted from the estimated position of the synchronization mark and corresponding synchronization signal, is the correct recovered set of data. Thus, a determination is made by the microcontroller 550, in communication with ECC circuitry 530, whether the data from buffer 540 is the user data by ECC correction analysis.

If ECC analysis indicates that the ECC field corresponds exactly to the user data, the user data has been properly recovered and is without error since the ECC field was derived from the user data. If the user data is error-free and corresponds exactly to the ECC field, the synchronization signal was timed correctly. If the synchronization signal was timed correctly, the synchronization mark location was estimated accurately. Thus, the data field of the sector can be recovered even though the synchronization mark itself was not readable, and the user data can be output to the host 90 for further processing, remapped to an undamaged location, or the like.

If there is some damage to a synchronization mark, or some debris in the vicinity thereof, there may also be some damage in the data field. In this case, the ECC field does not correspond exactly to the user data, however, the user data can still be recovered. If the data field has an error but is ECC correctable by the ECC circuitry based upon the ECC field, there is a very high probability that the user data has been recovered. Generally, if the data has been mis-framed by the time programmable synchronization signal generated by the disk sequencer 300, the user data will not be error-correctable because the error will be too significant. Thus, if the data field is ECC correctable so that the user data can be presumed to be recovered, then the synchronization signal was timed correctly. If the synchronization signal was timed correctly, the synchronization mark location was estimated accurately. Thus, the data field of the sector can be recovered even though the synchronization mark itself was not readable and the user data field contains error. Once recovered, the user data can be output to the host 90 for further processing, remapped to an undamaged location, or the like.

If the estimated synchronization mark results in the buffering of user data that is neither error-free nor ECC correctable, then a new estimate of the position of the synchronization mark is made and another iteration of the above procedure is made. In the next iteration, a different time-programmable signal is output from the disk sequencer 300 to the encoder/decoder 520, so that a different bit stream of data will be framed and placed in the buffer 540 corresponding to a different estimate of the synchronization mark's position. Again, the results of the synchronization mark estimate are ECC analyzed to determine whether the location of the synchronization mark was estimated accurately. If not, the procedure repeats. This procedure can repeat a finite number of times before determining that the data is not recoverable. A determination of unrecoverability could be made for a variety of reasons including that an insufficient number of iterations were attempted or that the synchronization field preceding the synchronization mark, the user data field or the ECC field was damaged beyond readability.

Figure 2A:
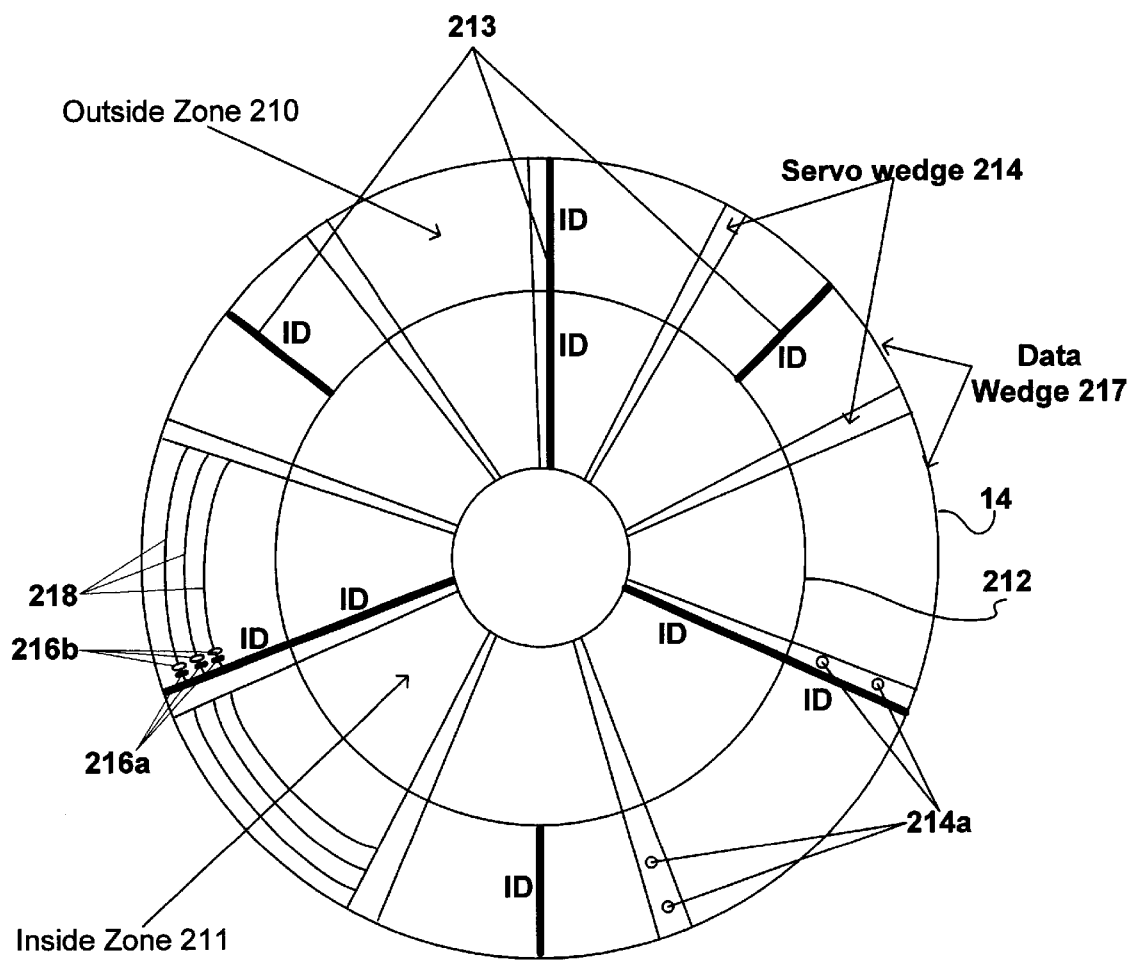
FIG. 2A represents an example of a formatted recording medium in accordance with the present invention.
Figure 2B:
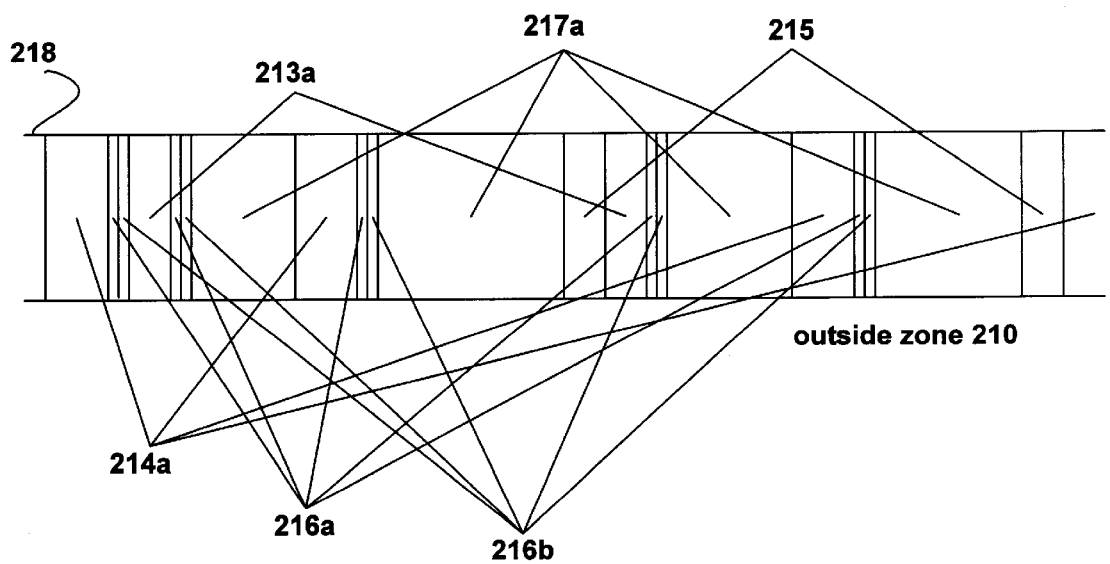
FIG. 2B shows examples of sectors contained in the outside zone on the medium shown in FIG. 2A in accordance with the present invention.
Figure 2C:
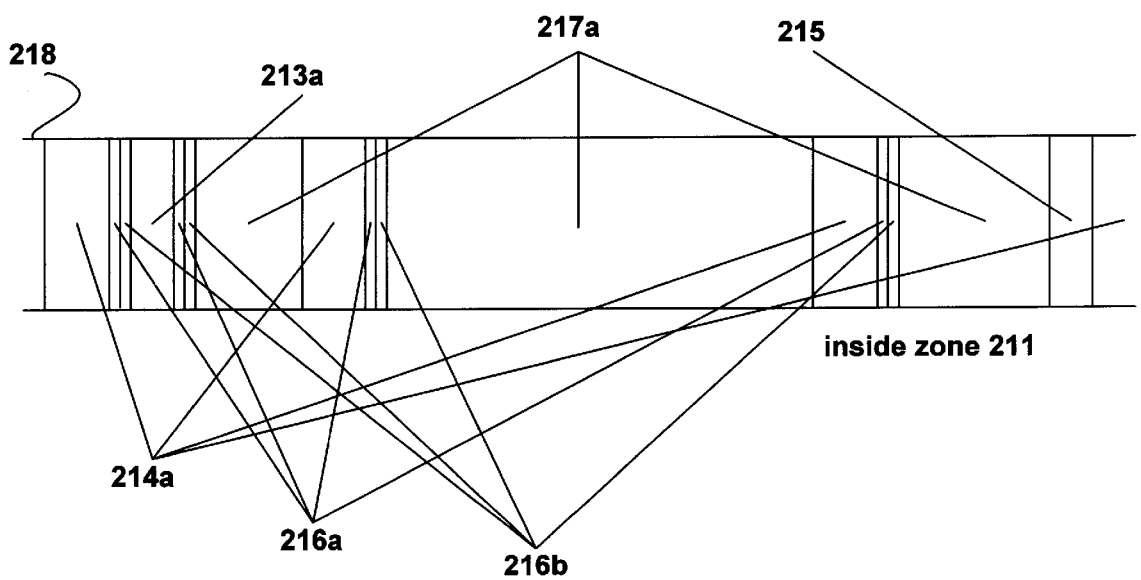
FIG. 2C shows examples of sectors contained in the inside zone on the medium shown in FIG. 2A in accordance with the present invention.

FIG. 2A represents an example of a formatted recording medium; however, there are many different formats that can be used with the present invention, and the format shown is for illustrative purposes only. Accordingly, the scope of the present invention is to be construed to encompass a variety of recording medium formats, such as a headerless formats. FIG. 2B shows examples of sectors contained on the outside zone 210 of the medium shown in FIG. 2A. FIG. 2C shows examples of sectors contained on the inside zone 211 of the medium shown in FIG. 2A. In the example format illustrated, recording medium 14 has an outside zone 210 and an inside zone 211, separated by radial division 212. Inside zone 210 has 3 sectors of data per revolution and outside zone 210 has 6 sectors of data per revolution. With additional reference to FIGS. 2B and 2C, the medium 14 has id field radial regions 213 for positioning id fields 213*a* containing information concerning sector identity, location, and the like. In addition, servo wedges 214 are regions in which servo fields 214*a* can be positioned to aid a head (e.g., head 46) in tracking a data path. Data tracks 218, having data regions 217*a* for the storage of data, are positioned within data wedges 217. Following an id field 213*a* is a synchronization field 216*a* and a synchronization mark 216*b*.

FIGS. 2B and 2C illustrate data sectors contained in the outside zone 210 and the inside zone 211, respectively. By way of example, in an ordinary pass along a data track 218, a head (e.g., head 46) first reads a servo field 214*a* for feedback control to maintain predetermined positioning along data track 218. Next, the head passes over an id field 213*a* and determines the identity of the sector, inter alia. Next, the head passes over a synchronization field 216*a* which aids in the creation of a clock signal for reading of the next portion passed over by the head, the synchronization mark 216*b*. Next, the head passes over a data region 217*a*, which can be decoded properly if the synchronization mark detect 510 generates a proper framing or synchronization signal in response to reading the synchronization mark 216*b*. Then, the head reads an ECC field 215, which enables analysis of the data collection for the existence of error.

If, however, the synchronization mark 216*b* is not readable due to damage, error, debris or other reasons, then the data region 217*a* likely will be framed improperly. Accordingly, traditional fault tolerance techniques may be employed to try to reread the synchronization mark 216*b*. If, however, these techniques are exhausted, an alternate means of recovering data must be used.

Figure 3A:
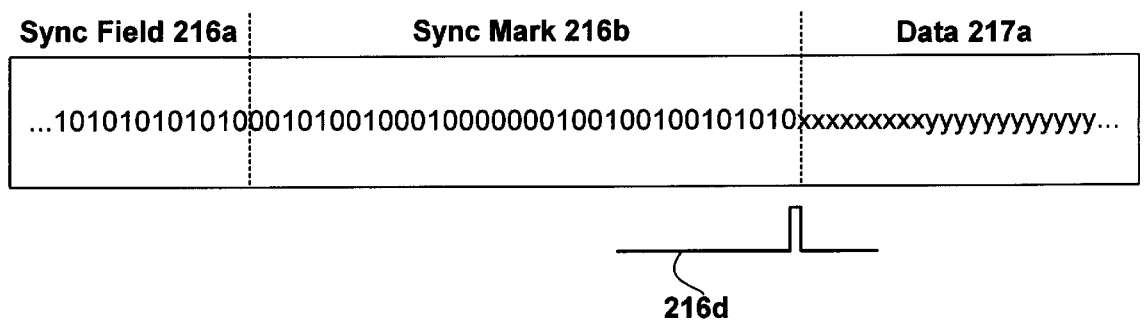
FIG. 3A represents an exemplary synchronization mark in accordance with the present invention.

FIG. 3A illustrates an example of an undamaged synchronization mark 216*b* in accordance with the present invention. At or before the time the head passes over the synchronization field 216*a*, the controller 88, which is running on a fixed clock signal prior to data synchronization, alerts the Read Channel IC 82 as to when the synchronization field 216*a* should be under the head based upon the recording medium format, the disk rotation speed, and the like. The Read Channel IC 82 then locks this synchronization field 216*a* data (e.g. . . . 10101010 . . . ) to a read/write clock which is then sourced to the controller 88. The controller 88 then switches over to use of this read/write clock which enables synchronous reading of the following synchronization mark 216*b*. If synchronization mark 216*b* is read correctly, mark detect 510 generates a framing signal which is output to the encoder/decoder 520. The synchronization mark 216*b* can be of a fixed length or fixed bit structure. In a preferred embodiment, synchronization mark 216*b* contains 35 bits. Also, the way that user data may be compacted or compressed in the data field may yield unique results distinguishable from the unique set of data in the synchronization mark 217*a*. Thus, the synchronization mark 216*b* can be created so as to be distinguishable from data in data regions 217*a*. The synchronization marks 216*b* identify to the controller 88, more particularly to mark detect circuitry 510, when to issue a signal for synchronizing the reading of data in data region 217*a*.

Some error in the synchronization field 216*a* is tolerable, but if too much is unreadable, then the synchronization mark 216*b* may also not be readable because the read/write clock for reading synchronization mark 216*b* may not be generated correctly. Consequently, data region 217*a* may also be unreadable.

If a part of synchronization mark 216*b* is not readable, then the synchronization or framing signal 216*d* may not be generated properly or at the right time. Consequently, data region 217*a* may be unreadable due to synchronization error. Essentially, if the synchronization mark 216*b* is damaged or written improperly, data in data region 217a may not be framed with accuracy, causing errors in accessing data region 217a.

For illustrative purposes, with an undamaged synchronization mark 216b, a head 46 passes over sync field 216a and by locking on the pattern in the sync field (e.g., 1010101010), a read/write clock is generated for reading synchronization mark 216b. Subsequently, the mark detect circuitry 510 is alerted to the synchronization mark 216b. In response to the synchronization mark 216b, a frame signal 216d is output from the mark detect circuitry 510 for synchronous reading and decoding of the subsequent user data field 217a. Having properly read the synchronization mark 216b, the user data field 217a is then framed and accessed without error.

Figure 3B:
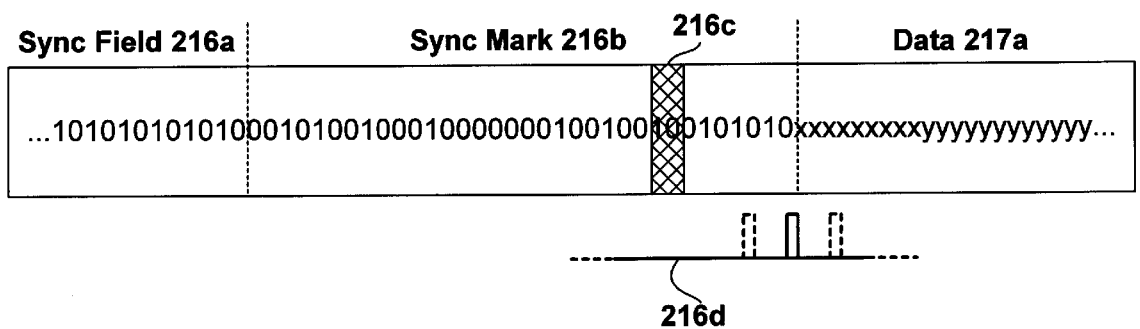
FIG. 3B represents an exemplary synchronization mark with an unreadable portion in accordance with the present invention.

By way of contrast, a synchronization signal 216d may not be generated correctly by mark detect circuitry 510 and there are a variety of reasons why this may occur. One reason may be that there is an unreadable portion of the synchronization mark 216b. FIG. 3B illustrates an example of a synchronization mark 216b with a damaged or unreadable portion 216c. A head 46 passes over sync field 216a and the read/write clock is generated for reading synchronization mark 216b. Subsequently, the mark detect circuitry 510 is alerted to the synchronization mark 216b. Before reaching the end of the mark portion 216b, however, the unique pattern contained in the synchronization mark 216b is disrupted by portion 216c which has been damaged or written improperly. Accordingly, the mark detect circuitry 510 does not locate the full synchronization mark 216b, and the user data field 217a can be not framed and accessed with framing signal 216d. Due to the damaged portion 216c, mark detect circuitry 510 is unable recognize the synchronization mark 216b to produce the frame synchronization signal 216d. And the present invention must be employed to recover the data.

Figure 4:
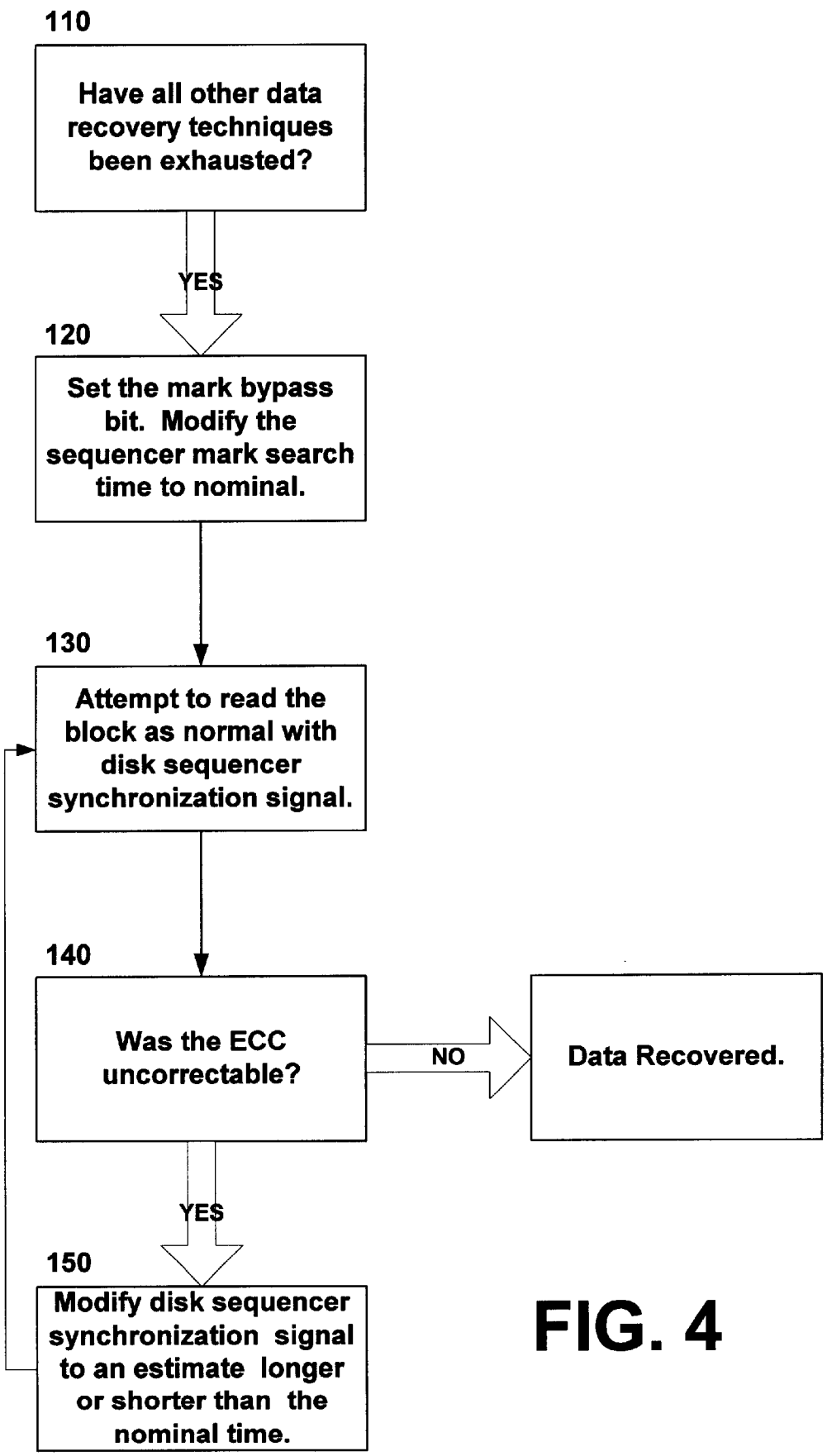
FIG. 4 represents a flowchart for a recovery algorithm in accordance with the present invention.

FIG. 4 represents a flowchart for a synchronization recovery technique in accordance with the present invention. Preferably, the instructions and parameters for this technique can be stored in a memory 560, and the technique can be implemented with microcontroller 550. A first step 110 determines whether all traditional data recovery techniques have been exhausted. This step could be bypassed, however, and the technique could move directly into utilization of the subsequent steps of the present invention for data recovery. Accordingly, in an alternate embodiment, traditional data recovery techniques need not be explored before step 120; however, this may not be desirable from a time savings analysis. For example, moving the disk drive head a predefined percentage off track is not a time intensive operation, relative to an iterative process. Thus, if traditional data recovery techniques are successful, the recovery technique is ended until a renewed interest in data recovery is manifest due to a subsequently encountered unreadable synchronization mark 216b.

Having exhausted traditional data recovery techniques, in step 120, a hardware mark detection bypass bit is set. As an input to a switching device, this bypass bit sets which of two signals the switching device 200 outputs. In a preferred embodiment, this switching device 200 is a multiplexor. In step 120, the disk sequencer mark search time is set to a nominal time, which corresponds to the nominal position, which is a first estimate of the starting location of a synchronization mark. The nominal time is set to read a hypothetical bit stream block at the time when a synchronization mark ought to be present, based on the architecture of the disk drive system, including motor speeds, and the format of the disk. The disk sequencer outputs a time programmable synchronization signal based on this nominal time causing the head to read the hypothetical bit stream block, the data region that follows this block and the ECC region.

In a preferred embodiment, the estimate of the starting position of the synchronization mark is made relative to a previously encountered synchronization field or synchronization mark. In another preferred embodiment, the estimate of the starting position of the synchronization mark is made relative to the last position previously known to be synchronized. In another preferred embodiment, the estimate of the starting position of the synchronization mark is made relative to a position of an id field or a servo field. The estimate of the starting position of the synchronization mark, however, can be made in other ways as well. This is because different recording mediums may have different formats which may lend themselves to different estimation optimization.

In step 130, the recovery technique moves the data block into a buffer and tries to read the data utilizing ECC correction procedures. Data can be corrected with ECC correction methods, but if the location of the synchronization mark itself has been estimated incorrectly i.e., if the nominal time was incorrect, and the ECC will be uncorrectable. The uncorrectable ECC is indicative that additional tries may have to be attempted. This is because if the starting position of the synchronization mark is estimated improperly, it is likely that the resultant synchronization signal for reading data will also be improper, and the data will be uncorrectable with the ECC circuitry.

In step 140, there is a determination as to whether the data collected as a result of the time programmed synchronization signal is error free or correctable by use of the ECC field. If error free or correctable, there is a high probability that the synchronization mark estimate was accurate, a correct synchronization signal was generated, and the data was framed correctly. Thus, data recovery from the sector is deemed successful. The recovery technique once again terminates until renewed interest in data recovery due to a subsequently encountered unreadable synchronization mark.

If, however, the data is not correctable by ECC correction, the synchronization mark having been missed, the recovery technique moves to step 150. The disk sequencer mark search time is then modified to be either a longer or shorter time than the nominal time, and the recovery technique returns to step 130 for an additional attempt to read the data based on a different estimate of location of a synchronization mark.

Since the nominal time is generally an accurate estimate of the positioning of the synchronization mark, the synchronization mark can ordinarily be found after a few iterations of the above procedure, and if ECC correctable or error free, the synchronization of the subsequent data will have been successful. These iterations which modify the nominal time act to window the estimated position of the synchronization mark so as to find the synchronization mark somewhere within this window. This is demonstrated in FIG. 3A and FIG. 3B. In FIG. 3A, since there is no error in the synchronization mark 216b, mark detect 510 properly generates framing signal 216d at the correct time. In FIG. 3B, however, the framing signal 216d has been switched to the time-programmed signal generated by the disk sequencer 300, and a window of estimates for this signal are shown. If the location of the synchronization mark still can not be found within this window using the above procedure because e.g., the data field has been destroyed beyond recognition or the disk geometry has changed due to a warp or asperities, the recovery technique is exhausted after a pre-selected number of attempts and the data sector is deemed unreadable.

Additional techniques can be used to determine how to modify the disk sequencer mark search time. For example, in a preferred embodiment, the search time can be modified based upon a series of increases followed by a series of decreases to capture a full range of possible framing windows or times. In still another preferred embodiment, the time can be increased by one time unit, then decreased by two time units, then increased by three time units, then decreased by four time units, and so on, so as to view the data blocks closest to the nominally chosen one first. Furthermore the disk sequencer can revisit the nominally selected time in order to check that a small error in motor speed or the like is not affecting the resulting positioning of the estimate. Additional ways of modifying the nominally chosen time within a pre-selected window for further iterations of steps 130 through 150 can also be chosen in accordance with the present invention.

The amount of time by which to modify the nominal time depends on characteristics of the disk drive system. Such factors to take into account by the firmware include disk rpm, the layout of the sectors, the frequency of zones, motor speed tolerance, spin tolerance, time taken to find last synchronization mark, time since last synchronization mark and the like.

In a preferred embodiment, approximately 24 iterations are carried out by the mark detection bypass firmware before forgoing the sector and deeming it unreadable. More iterations can be carried out, but once the window of data to be framed is far enough away from the nominally chosen window of data, the probability of successful framing of the synchronization mark begins to decrease. Less iterations can also be carried out, with corresponding gains in time; however, if too few iterations are carried out, the vicinity of the nominally selected position may not have been explored thoroughly. Thus, for a given disk drive system, type of damaged synchronization mark, and design and time constraints, an optimal number of iterations can be preselected.

Figure 5:
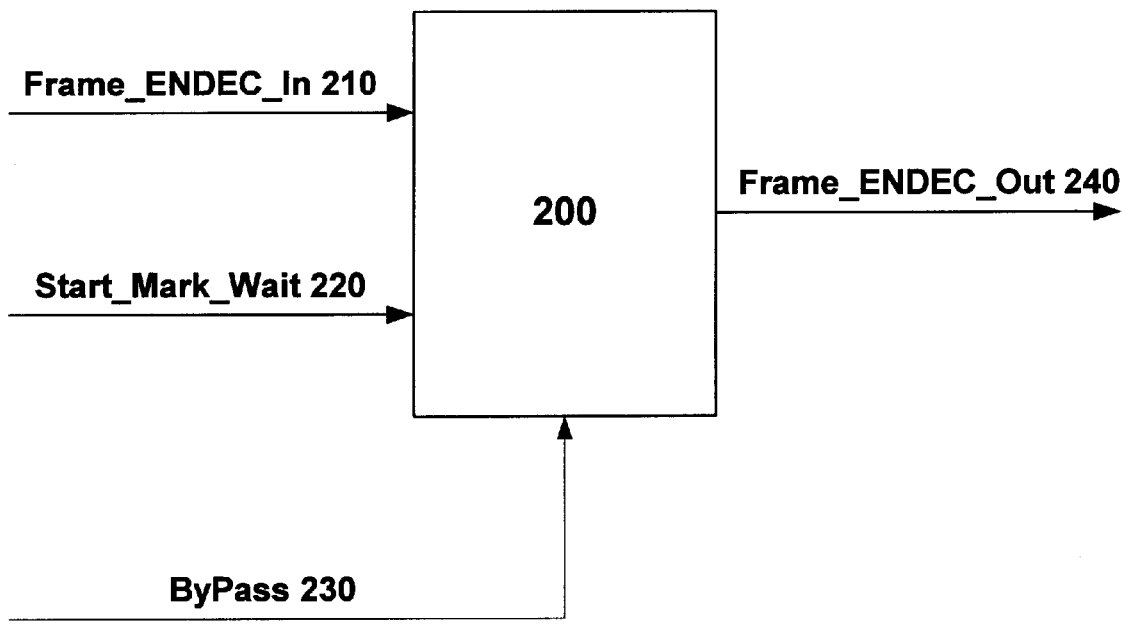
FIG. 5 represents a hardware implementation of a mark detection bypass in accordance with the present invention.

With reference to FIG. 5, a hardware implementation of the switching device 200 used in detection mark bypass is shown. Switching device 200, which can be a Two-to-One multiplexer, has two input signals. Frame_ENDEC_In signal 210 represents a timing signal governing the ordinary path or operation for an encoder/decoder when the head encounters a synchronization mark. During ordinary operation, when bypass bit 230 is not set, Frame_ENDEC_Out output signal 240 is set by multiplexer 200 to be Frame_ENDEC_In signal 210, the signal from the mark detect circuitry. When the bypass bit is set as a result of the exhaustion of other conventional data recovery techniques, bypass bit 230 is set, and Frame_ENDEC_Out output signal 240 switches to Start_Mark_Wait input signal 220 via multiplexer 200.

Start_Mark_Wait input signal 220 is a time-programmable signal output by the disk sequencer 300 which can be modified in accordance with the parameters of the disk drive system. In accordance with the present invention, input signal 220 is first programmed with a nominal time. The nominal time is a preselected time programmed into the disk drive system e.g., memory 560, and is calculated based on the characteristics of the disk drive system such as the disk drive rotational speed, the radial position of the disk drive head, the preselected data format of the disk being read, and the like. This nominal time represents the estimate of where the data synchronization mark is likely to be positioned.

While the present invention has been described in connection with the preferred embodiments of the various figures, it is to be understood that other similar embodiments may be used or modifications and additions may be made to the described embodiment for performing the same function of the present invention without deviating therefrom. For example, although in a preferred embodiment, a multiplexor is used, other implementations may be used e.g., switches, EPROMS, gated logic, and the like. Therefore, the present invention should not be limited to any single embodiment, but rather construed in breadth and scope in accordance with the recitation of the appended claims.

What is claimed is:

1. A method for the recovery of data from a recording medium wherein a synchronization field is at least partially unreadable, said method comprising:

estimating a starting location of the synchronization mark;

determining whether said starting location is a correct estimate; and adjusting said starting location within a predetermined window if said starting location is an incorrect estimate.

2. A method according to claim 1, wherein said determining is accomplished by ECC correction of a user data field, whereby if the user data field is not ECC correctable, the starting location is not correct and is adjusted.

3. A method according to claim 1, wherein other recovery techniques are exhausted before said estimating.

4. A method according to claim 1, wherein said starting location is adjusted a plurality of times before regarding the data as unrecoverable.

5. A method according to claim 1, wherein a time programmable synchronization signal for the synchronization of data is generated and output by a disk sequencer based on the starting location.

6. A method according to claim 1, wherein the starting location is estimated based upon recording medium format and recording medium rotational speed and is estimated from a recording medium region located previous to the unreadable synchronization mark.

7. A method according to claim 1, wherein said recovery mode is enabled by way of a switching device.

8. A method according to claim 7, wherein said signal switching device is a multiplexor for switching between an ordinary mode for locating a synchronization mark and said recovery mode for the recovery of data.

9. A computer-readable medium bearing computer-executable instructions, said instructions carrying out the method as recited in claim 1.

10. A computer-readable medium according to claim 9, wherein said computer-readable medium comprises a semiconductor memory device.

11. A method for the recovery of data from an unreadable sector having at least a portion of a synchronization field that is unreadable, said method comprising:

estimating a nominal position, said nominal position representing a starting position of a synchronization mark;

generating a synchronization signal for the synchronization of data based on said nominal position;

testing the accuracy of said nominal position;

adjusting the nominal position within a predetermined window in the proximity of said estimated nominal position.

12. A method according to claim 11, wherein said testing is accomplished by ECC correction of the user data field, whereby if the user data field is not ECC correctable, the nominal position is not accurate and is adjusted.

13. A method according to claim 11, wherein other recovery techniques are exhausted before said estimating.

14. A method according to claim 11, wherein said nominal position is adjusted a plurality of times before regarding the data as unrecoverable.

15. A method according to claim 11, wherein said generated synchronization signal is time programmable and output by a disk sequencer.

16. A method according to claim 11, wherein the nominal position is estimated based upon recording medium format and recording medium rotational speed and is estimated from a recording medium region located previous to the unreadable synchronization mark.

17. A method according to claim 11, wherein said recovery mode is enabled by way of a switching device.

18. A method according to claim 17, wherein said signal switching device is a multiplexor for switching between an ordinary mode for locating a synchronization mark and said recovery mode for the recovery of data.

19. A computer-readable medium bearing computer-executable instructions, said instructions carrying out the method as recited in claim 11.

20. A computer-readable medium according to claim 19, wherein said computer-readable medium comprises a semiconductor memory device.

21. A method for the recovery of data from a recording medium, comprising:

estimating a starting location of a synchronization mark;

generating a synchronization signal for the synchronization of data based upon said estimate of a starting location of a synchronization mark;

storing data based on said synchronization signal;

testing the stored data with ECC correction, wherein if the data is not ECC correctable, the position of the estimated starting location is not accurate;

adjusting the position of the estimated starting location within a predetermined window if the previous position of the estimated starting location is not accurate.

22. A method according to claim 21, wherein other recovery techniques are exhausted before said estimating.

23. A method according to claim 21, wherein said position of the estimated starting location is adjusted a plurality of times before regarding the data as unrecoverable.

24. A method according to claim 21, wherein said generated synchronization signal is time programmable and output by the disk sequencer.

25. A method according to claim 21, wherein the first position of the estimated starting location is estimated based upon recording medium format and recording medium rotational speed and is estimated from a recording medium region located previous to the unreadable synchronization mark.

26. A method according to claim 21, wherein said recovery mode is enabled by way of a switching device.

27. A method according to claim 26, wherein said signal switching device is a multiplexor for switching between an ordinary mode for locating a synchronization mark and said recovery mode for the recovery of data.

28. A computer-readable medium bearing computer-executable instructions, said instructions carrying out the method as recited in claim 21.

29. A computer-readable medium according to claim 28, wherein said computer-readable medium comprises a semiconductor memory device.

* * * * *